Figure 1:
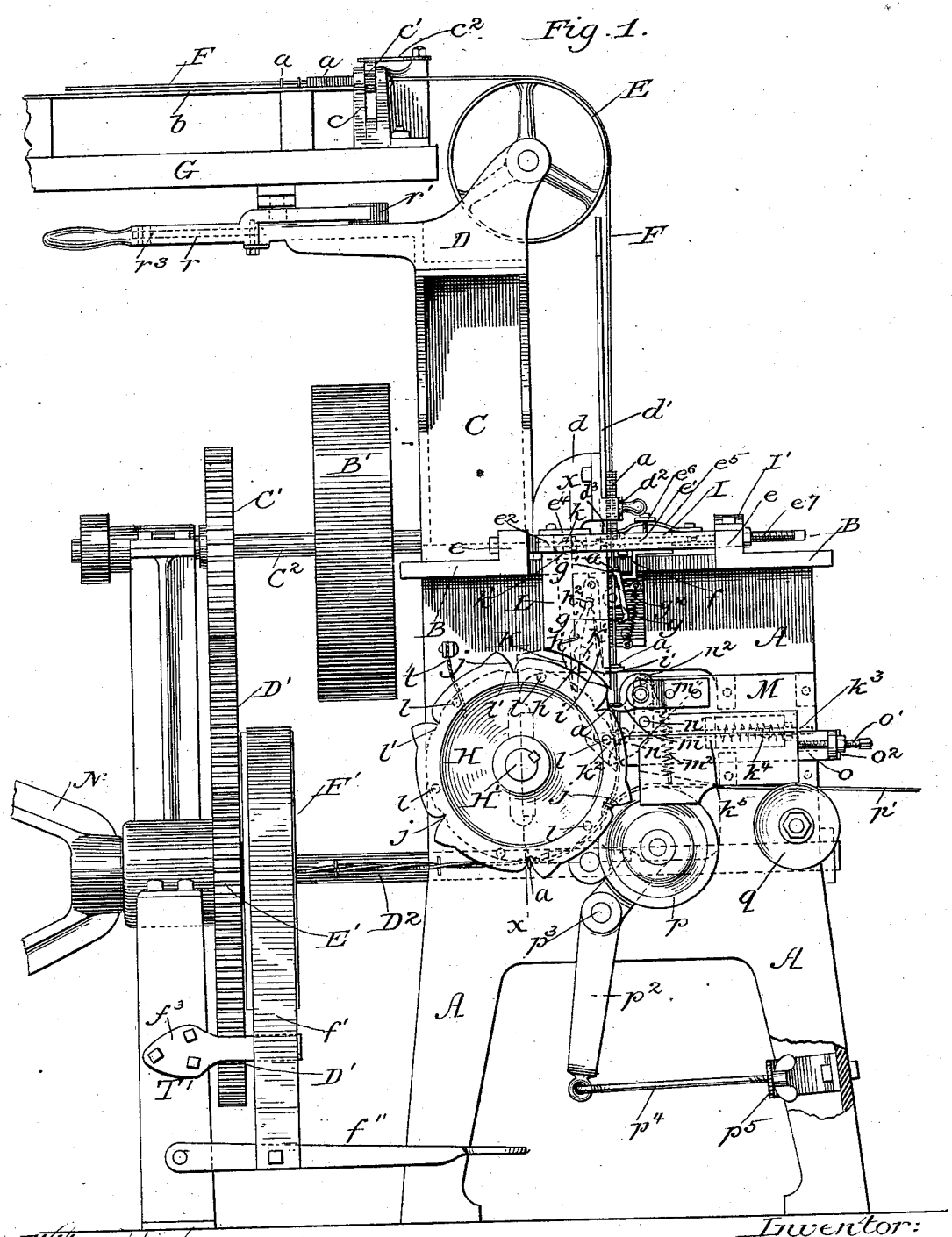

(No Model.) 5 Sheets—Sheet 1.

O. P. BRIGGS.
MACHINE FOR MAKING BARBED WIRE.

No. 281,443. Patented July 17, 1883.

Witnesses:
Frank S. Blanchard
A. Barthel

Inventor:
Orlando P. Briggs
By Rob't S. Sprague
Attorney (No Model.)
O. P. BRIGGS.
MACHINE FOR MAKING BARBED WIRE.
No. 281,443. Patented July 17, 1883.
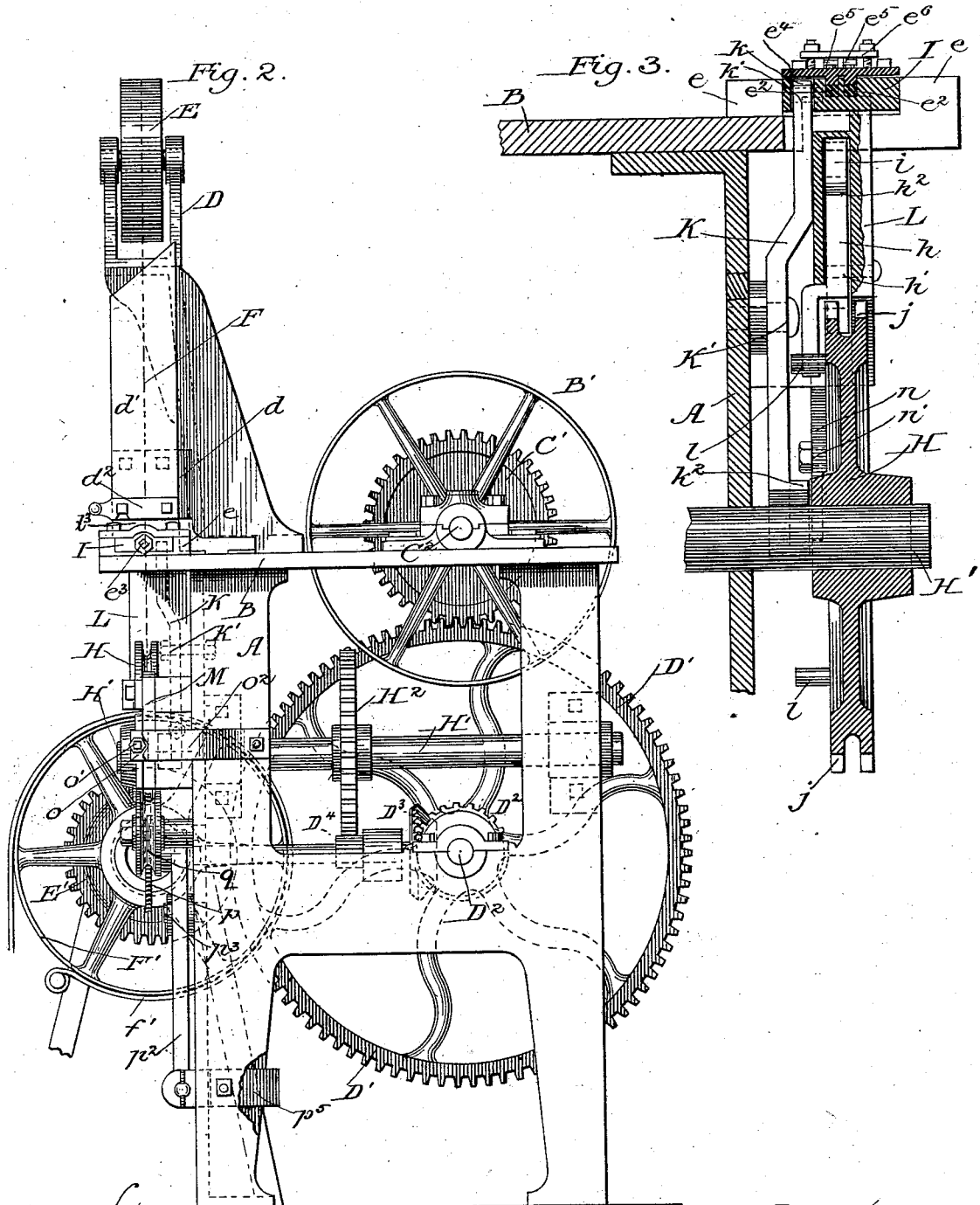
Witnesses:
Frank Blanchard
A. Barthel
Inventor:
Orlando P. Briggs
By Thos. S. Sprague
Attorney

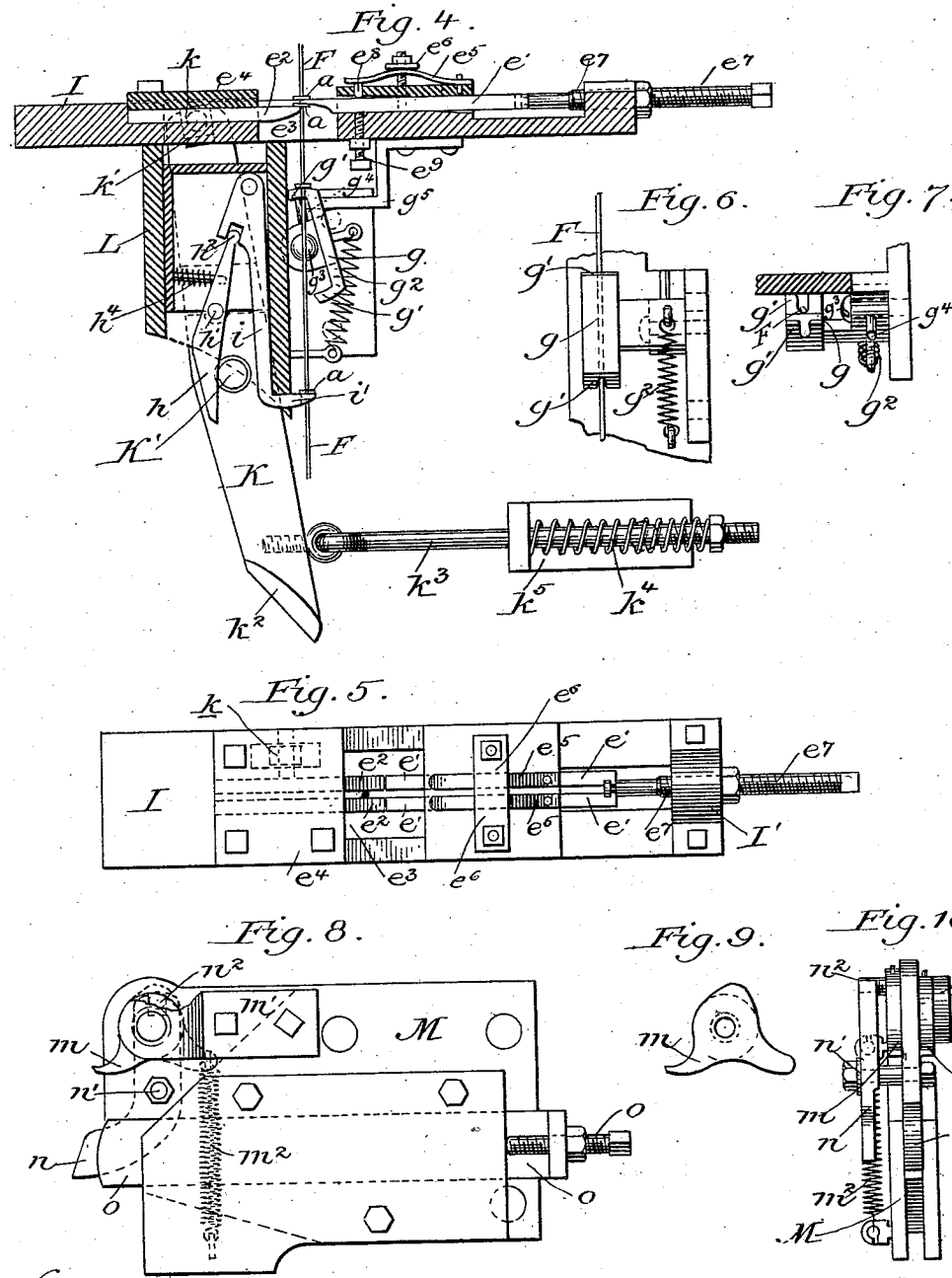

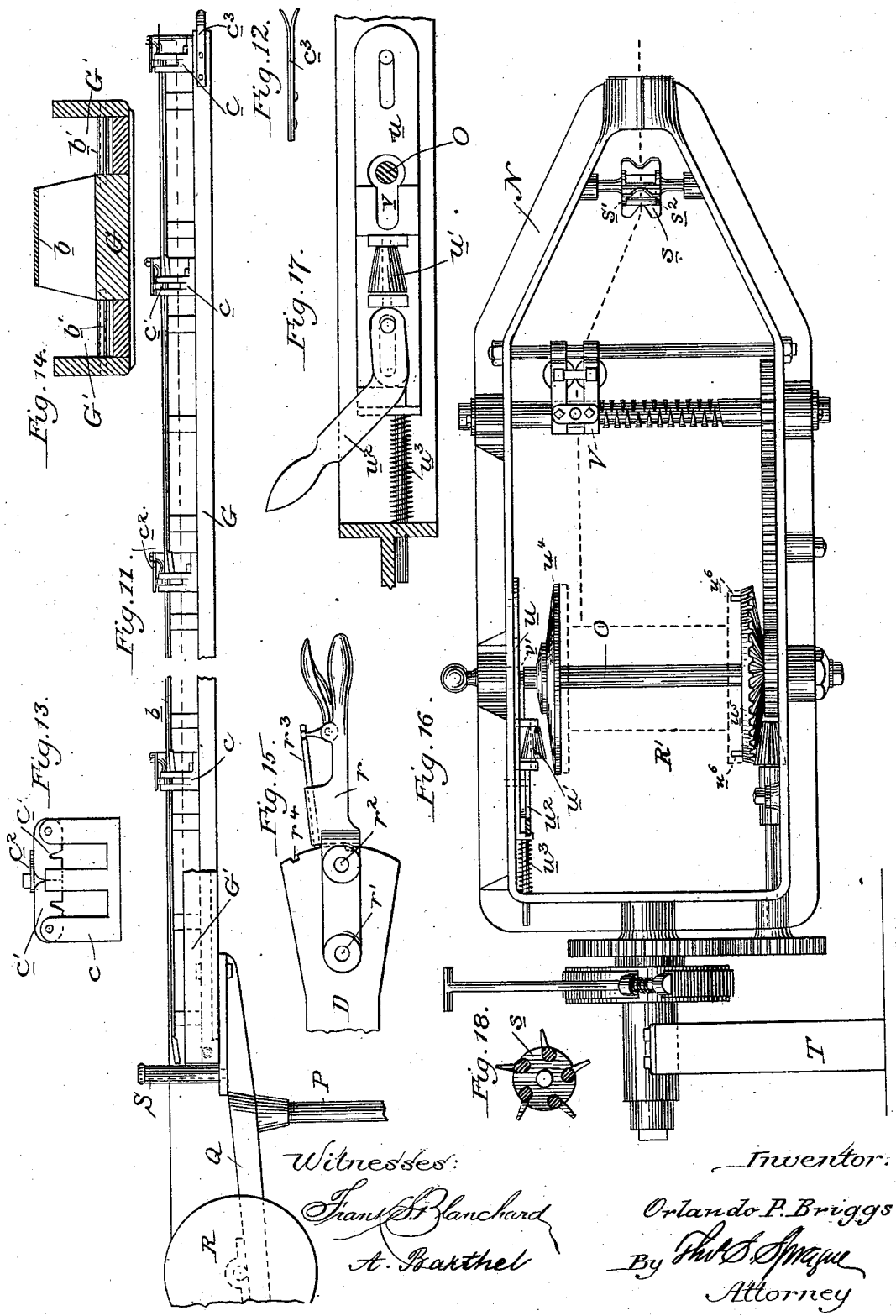

(No Model.)  5 Sheets—Sheet 5.

O. P. BRIGGS.
MACHINE FOR MAKING BARBED WIRE.

No. 281,443. Patented July 17, 1883.

Witnesses:
Frank St. Blanchard
A. Barthel

Inventor:
Orlando P. Briggs
By Thos. S. Sprague
Attorney

UNITED STATES PATENT OFFICE.

ORLANDO P. BRIGGS, OF CHICAGO, ILLINOIS, ASSIGNOR TO THE THORN WIRE HEDGE COMPANY, OF SAME PLACE.

MACHINE FOR MAKING BARBED WIRE.

SPECIFICATION forming part of Letters Patent No. 281,443, dated July 17, 1883.

Application filed February 11, 1882. (No model.)

*To all whom it may concern:*

Be it known that I, ORLANDO P. BRIGGS, of Chicago, in the county of Cook and State of Illinois, have invented new and useful Improvements in Machines for Making Barbed Wire; and I do hereby declare that the following is a full, clear, and exact description thereof, reference being had to the accompanying drawings, which form a part of this specification.

The invention herein set forth relates to the manufacture of that class of barbed-wire fencing generally designated as the "Kelly barbed wire." In this class of fence-wires the barbs are centrally apertured, and are first strung upon a single wire, then distributed thereon, and finally in some manner secured so as to remain at substantially equal distances apart. Ordinarily barbs of this class are cut from sheet metal in diamond form, and it has been the more usual practice to fasten the barbs in place upon the fence-wire by compressing them edgewise, so as to laterally contract the aperture therein and to thus cause the barb to hug the wire. With this wire so provided with barbs a second and plain or unbarbed wire has commonly been twisted to give the desired strength. The barb has, however, been held in place on the first wire by a second wire twisted therewith, though no machine has, prior to this invention, been devised to properly space and hold them while being thus secured. As the double or cable form of the wire is the form of fencing now generally used, and as the barbs may be sufficiently held by the second wire alone, the latter mode of securing the barbs at proper intervals is preferred, and the machine herein described is accordingly constructed to secure the barbs by this method. The devices herein set forth for spacing the barbs preparatory to fastening them may, however, be used in connection with means for securing the barbs by compression, as will be obvious from the description.

In all machines heretofore built for making the Kelly barbed wire mechanical forces have been exclusively relied upon to properly distribute the barbs preparatory to fastening them. Such machines have also been made to give an intermittent forward movement of the fence-wire, said wire being arrested while the mechanisms for fastening the barbs are in operation.

Among the objects of the present invention are, first, to provide a machine adapted to space and fasten the barbs while giving the fence-wire a continuous forward motion; second, to provide a machine for separating and spacing the loosely-strung barbs upon one wire, and securing them exclusively by a second wire with the first; and, third, to provide a machine in which the force of gravity or the weight of the barbs is utilized in distributing or spacing said barbs on the wire upon which they are strung.

To these and other ends that will hereinafter further appear the invention consists in the matters set forth in the following description and pointed out in the appended claims.

Figure 19:
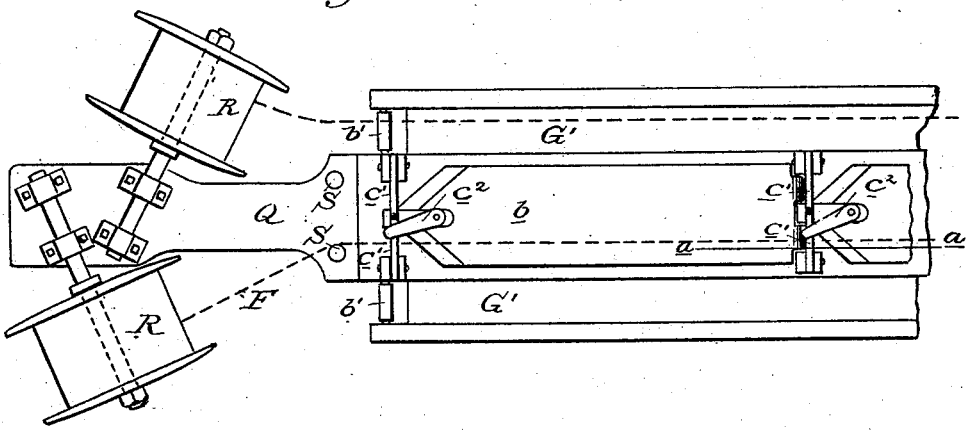
Figure 20:
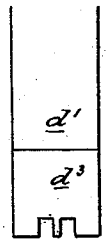
Figure 21:
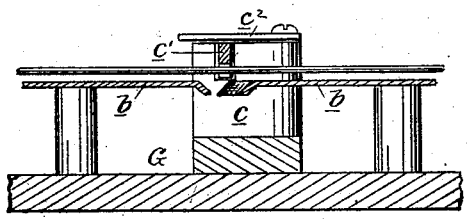

In the accompanying drawings, Figure 1 is a side elevation of my machine. Fig. 2 is a front elevation thereof. Fig. 3 is a cross-section of the spacing-wheel on line $x$ $x$ in Fig. 1, showing also its connections with the shuttle. Fig. 4 is a vertical central section through the shuttle. Fig. 5 is a plan view of the shuttle. Figs. 6 and 7 show different views of the rock-stop shown in elevation in Fig. 4. Fig. 8 shows the plate marked M in Fig. 1 in a detached and enlarged elevation, showing also the various connections thereto. Fig. 9 is a detached view of the fingers $m$. Fig. 10 is an end view of Fig. 8. Fig. 11 is a side elevation of the wire-carrier, the end portion of which is also shown in Fig. 1. Fig. 12 is a detached detail, showing the wire-clamp $c^3$, also shown in Fig. 11. Fig. 13 is a detached elevation of the gate $c$ in Fig. 11. Fig. 14 is a cross-section of the wire-carrier. Fig. 15 is a detached view of the switch-lever $r$, shown in a different view in Fig. 1. Fig. 16 is a plan view of the twisting-frame N, with all the different parts connected therewith. Fig. 17 is a detached view of the latch-plate $u$, shown in its proper position in Fig. 16. Fig. 18 is a connection of the squirrel-wheel $s$ shown in Fig. 16. Fig. 19 is a top view of spools and carrier. Fig. 20 is an elevation of guide-plate $d^3$. Fig. 21 is a section through line $a$ $a$ of Fig. 19.

The general features of construction and operation in the machine as here shown may be briefly outlined as follows: Separate spools are provided at proper points in the machine for the several wires that are to form the completed cable, and it is contemplated that the barbs shall be all strung upon one of said wires previous to its introduction to the machine. Said barbs are massed together at or near the free end of the wire which carries them, in sufficient numbers to occupy the entire length of wire on the spool when properly distributed or spaced thereon. Elevated supports are provided, upon which most of that portion of the wire whereon the barbs are so massed is stretched in a horizontal position. Gates distributed at intervals along the course of these supports divide the mass of barbs into separated groups, whereby the fence-wire is more readily drawn forward through them, said gates being constructed to allow of their being raised to permit a group of barbs to pass them from time to time, as desired by the operator. At the delivery end of said supports is located a wheel, over which the wire is deflected, so as to give the latter a downward course toward and through the barb-spacing devices, and along which vertical portion of the wire the barbs thereon may fall by their gravity. A group or mass of barbs is delivered from the horizontal to this vertical part of the wire from time to time by lifting the gate next the deflecting-wheel, when said barbs are drawn forward over the said wheel by the movement of the wire. The rear gates are then lifted and the several groups advanced toward the deflecting-wheel. From the deflecting-wheel the wire passes to a grooved wheel having notches at equal intervals in its periphery for the accommodation of the barbs. Said notches give the wheel a resemblance to a sprocket, and it is herein denominated a "sprocket-wheel." As here shown, the wire is guided by the deflecting and sprocket-wheels in a vertical direction, and along this vertical part of the wire are located, first, devices called "pickers," which separate the barbs, one at a time, from a superposed mass; and, second, a series of vibrating stops, which alternately catch and release the falling barbs, and the last of which stops finally delivers them successively into the notches of the sprocket-wheel. Devices are arranged to deliver the second wire alongside the barbed wire while the latter is in bearing upon the sprocket-wheel, and from said wheel both wires pass in a horizontal direction to the twister. The twist is formed in the two wires up to the point where the latter leave the sprocket-wheel, so that the barbs are closely held by the two wires at the distance apart given them by the spacing devices. The twister or flier in the machine shown is directly and positively geared with the other rotating parts. To enable the operator to quickly arrest the machine in case of accident, therefore, a powerful friction-brake is applied to the flier, whereby this effect may be obtained. The elevated support (first above referred to) for that part of the wire which carries the mass of barbs is made duplex, or is constructed with two sets of gates and guides arranged side by side, so that when one wire is being fed into the machine a second may be arranged in place, ready for use. The duplex supports are therefore movable and combined with shifting and locking devices, whereby, when one wire is used up, the other may be quickly brought into line with the deflecting-wheel. By this means the machine may be kept more continuously in operation. Along the entire course of the barbs until they reach the sprocket-wheel, devices in the nature of guide-plates are arranged, by which the barbs are held with their points in the same direction across the wire, so that they may properly engage with the successive stops.

The machine will now be particularly described by reference to the drawings and to the letters marked thereon.

In said drawings, A is a frame which supports portions of the working devices of the machine.

B is a table or bed-plate sustained by the frame A.

C is a bracket extending upward from the bed-plate, and furnishing bearings for the deflecting-wheel E, and also a support for the laterally-movable end of the horizontal carrier-frame G.

Q is a bracket rigidly attached to the opposite or rear end of the carrier-frame, being pivotally supported upon the post P. This bracket has obliquely-arranged spindles upon its rear extension, upon either of which may be removably journaled a spool, R, carrying a fence-wire, F, having barbs ready strung thereon at its free end sufficient in quantity to supply the full length of said wire when they are properly separated and distributed, as subsequently performed by the machine.

Centrally upon the frame G are supported a number of longitudinally-arranged plates or tables, b, somewhat elevated above the frame, and arranged in line with each other, for the support of that portion of the wire F upon which the barbs are strung. Said plates are of width sufficient to allow two wires, with barbs strung thereon, to lie lengthwise and side by side on the plate without contact or interference of the barbs on one wire with those on the other. At that end of each of these plates nearest the spools R said plates are beveled downwardly and laterally, as more clearly indicated in Figs. 19 and 21, and each of said plates is also downwardly beveled at its opposite end, as shown by transverse shaded lines in said Fig. 19 and in side elevation, Fig. 21. Adjacent to said last-mentioned end of each supporting-plate b is located a transverse upright, c, having two vertical slots, arranged side by side and distant from the edges of the plates inwardly, say, about one-fourth of the width of said plates, as shown in Fig. 13, the said vertical slots in said upright being of sufficient width to allow the barbs to pass through them in a horizontal position. The outer arms of the uprights c are transversely and vertically slotted to receive the outer ends of the gates c', which are pivoted in said outer arms opposite the depressed ends of the plates b, as clearly shown in Fig. 13. These gates are provided with central notches, $c^4$, in their lower edges, to allow the wires F to freely pass therein; but when in place for this purpose said gates hold the barbs from movement with the wire. The upper surfaces of the tables b are usually about a fourth of an inch below the level of the upper extremities of said notches $c^4$, which is a little more than half the width of the barb in its middle and broadest part, so that the wires F, having barbs thereon and resting upon said tables b, will freely pass through said notches when the gates are closed.

The depression or downward inclination of the adjacent end of the table b is for the purpose of allowing the wires to pass with equal freedom when they are somewhat bent as when they are straight, room being thus given for a downwardly-bent portion of the wire to settle just in front of a gate, instead of causing the wire to bear too severely against the upper end of the notch of the said gate.

In order to hold the gates c closed during the operation of the machine, a button, $c^2$, is pivoted to a central arm of the upright in position to swing over the inner end of the said gates.

The object of the uprights c and the gates thereto attached is to divide the body of barbs strung upon the wire F into small groups, in order to prevent them from binding upon the fence-wire, and thereby interfering with the free forward movement of the latter. A further object of the gates c' is to hold the wires in place upon the tables b, and particularly to prevent the end of the wire last drawn from the spool from flying off the table and becoming entangled with the flier, which is located directly beneath it.

The object of the laterally and downwardly beveled ends of the tables b is to bring the barbs into horizontal position as they approach the several gates, in order that they may bear transversely against the said gates or crosswise of the notches $c^4$ in the lower edges thereof, for otherwise they would be likely to tip and bind upon the wire F, so as to impede the free forward movement of the latter.

The duplex construction of the uprights c and gates c' is to accommodate two fence-wires arranged parallel with each other upon the tables b, as may be understood from Fig. 19, and each beveled side at the ends of the said tables is for the adjustment of the barbs on the corresponding wire, F, as will be apparent from said figure.

For the purpose of directing the wires from the spools into proper position, through the gates c' and upon the tables b, posts S S are provided adjacent to the spools, (being preferably in the nature of roller-pins,) inside which the several wires F are trained, as also shown in Fig. 19.

At each side of the line of tables b, and supported by the carrier-frame G, is a trough, G', in which the wire of a full spool, having the barbs massed thereon, is first laid, preparatory to its adjustment upon the table b and beneath the gates c'.

At the end of the trough nearest the spool is located a horizontal roller, b', which allows the barbs upon the end of the wire to be more freely drawn forward, it being understood that the spool is brought to the machine having the barbs grouped on the outer or free end of the wire, and having said free end temporarily fastened to the flange of the spool, in order to confine the wire and barbs. In placing the spool on the machine and adjusting the wire and bars the outer end of the wire is loosened from the spool-flange and is drawn forward in the trough G', and the end of the wire is temporarily fastened in the clamping device $c^3$, Fig. 11, consisting, as here shown, of two forked springs. (More plainly shown in Fig. 12.) The wire having the barbs massed thereon being first stretched out in the trough, it is then placed in position on the series of tables b and beneath the gates c', ready for use when the wire upon the other spool shall have been exhausted, the end of the wire being allowed to remain in the clamp $c^3$ until it is desired to splice it with the last end of the wire being barbed. When one of the wires F has been used up, the other is brought into line with the deflecting-wheel E by laterally shifting the adjacent end of the carrier-frame G, which is accomplished by means of the shifting-lever r. (Shown in Figs. 1 and 15.) This lever is pivoted at r' to the rearwardly-projecting arm $C^3$ of the upright C, and, at a suitable distance inward from this pivotal point, it is also pivoted at $r^2$ to the under surface of the carrier-frame G. The inner end or edge of the supporting-arm $C^3$ is curved in the arc of a circle drawn from the pivotal point r', and is provided with two notches to admit the locking-slide $r^3$, attached to the lever r, in the usual manner of such devices, by which the carrier is held permanently in place for either of the wires F to be properly delivered to the deflecting-wheel E. The upper surface of the wheel E is arranged in line with the upper surface of the tables b, and said wheel has a broad periphery, preferably somewhat concaved or grooved, so that the wire will draw to the center thereof, though it may be plane or cylindrical, as shown in Fig. 2 of the drawings.

Beneath the wheel E, and near the lower part of the machine, is mounted on a horizontal axis the sprocket-wheel H, having a grooved periphery, as will be further described. Over this wheel the fence-wire F passes from the deflecting-wheel E in a vertical direction, in order that the barbs supplied to said vertical portion of the wire may fall thereon by gravity.

Between the wheels E and H are arranged a number of devices for separating the barbs $a$, one by one, from the bottom of a column supplied from time to time from the horizontal to the vertical part of the wire F, and for controlling their movements until delivered to the sprocket-wheel. These devices will next be described.

First, the barbs upon the vertical part of the wire F are guided into a regular position parallel with the axis of the sprocket-wheel by means of an upright stationary guide-plate, $d'$, arranged just back of the wire F, and having its upper end laterally inclined, as seen in Fig. 2, and also bent backward away from the wire slightly, as shown in Fig. 1, so as to engage and turn the ends of any irregularly-directed barbs without causing the latter to bind on the wire. The lower end of said guide-plate stands at about half the width of a barb from the wire, so as to merely permit the barbs upon the latter to freely pass the same. In continuation of the guide-plates $d'$, a steel plate, $d^3$, is provided, which is notched at its lower edge, as shown in Fig. 20, for the purpose of allowing the reciprocating pickers, which will be further described, to pass through said notches. The guide-plates $d'$ and $d^3$ are both secured to a bracket, $d$, on the upper surface of the bed-plate B. Below said bed-plate, and from the lower end of said steel plate $d^3$, said guide-plates have continuation in the front vertical face of a casting, L, which extends from said bed-plate into proximity with the spacing-wheel, and whose other uses will be hereinafter referred to.

In front of the steel guide-plate $d^3$, and at a suitable distance therefrom to allow the barbs to pass between it and said plate, is a second narrow guide-plate, $d^2$. (Shown in Figs. 1 and 2.) The object of this is to hold the wire from swaying laterally under the action of the pickers or shuttle. This plate $d^2$ is pivoted, and one end is adapted to be swung up out of the way to give access to the wire and the barbs thereon, for the purpose of adjusting the pickers for remedying any defect in the machine at this point.

I is a shuttle-carrying device for separating at regular intervals one barb at a time from the body of barbs $a$ resting upon it. Said shuttle, as here constructed, consists of a rectangular casting mounted so as to reciprocate longitudinally and horizontally in two supporting-lugs, $e\ e$, one at each end of the shuttle, properly planed out to receive it, and provided with caps I' for the retention of the shuttle in place. Said shuttle is centrally apertured at $e^3$ to allow the wire and barbs to pass downward through it, and is provided with two oppositely-arranged front and rear so-called "pickers," $e'$ and $e^2$. By reference to Figs. 4 and 5 it will be seen that said pickers consist of horizontal chisel-like tools secured to the shuttle parallel and in line with each other, as viewed from the top, and with their free ends protruding from opposite directions in the aperture $e^3$ of the shuttle. The pickers of each pair are also seen from Fig. 5 to be separated by an oblong space sufficient to allow free passage for the wire F between them, while said pickers are carried backward and forward in the reciprocal movement of the shuttle. As viewed laterally in Fig. 4 the pickers are seen to be beveled at their ends from the under side, and the ends of the outer or front pair of pickers, $e'$, are elevated above the rear pair, $e^2$, by the thickness of a barb. The movement of the shuttle is such that when the latter is carried forward the column of barbs on the vertical part of the wire F will escape the front pickers, $e'$, and will fall and rest on the rear pair, $e^2$, (which may therefore be properly called "supports,") and that when the shuttle is carried backward the chisel-shaped ends of the front pickers enter the barb column above the lowermost barb thereof, while the rear pickers or supports are withdrawn from beneath it. As a consequence, said barb is detached from the column, and is free to fall along the wire F. To secure this operation of the pickers, their free ends or edges are preferably arranged nearly above each other, or substantially in the same vertical transverse plane, as plainly indicated in said Figs. 4 and 5 of the drawings.

The pickers are set in longitudinal grooves in the surface of the shuttle, and the rear ones, or supports $e^2$, are held fixedly in place by the clamping-plates $e^4$. The front pickers are held in place by means which provide for suitable positive vertical adjustment thereof, in order to adapt them for work on barbs of various thicknesses. They are also held by means which provide for their automatic vertical adjustment, that they may meet the requirements of slight accidental variation in the thickness of the barbs in the same mass or column present on the wire F. For these purposes a plate, $e^{10}$, is bolted to the shuttle over the pickers, $e'$, which plate is constructed to afford room beneath it to allow the free or working ends of the said pickers to rise and fall, as indicated in Fig. 4.

Beneath the working ends of the pickers $e'$ are located vertical adjusting-screws $e^9$, which bear against the under side of the pickers, and which serve to positively raise and support their ends at any desired distance above the adjacent ends of the rear and stationary pickers, $e^2$. Above the plate $e^{10}$ are located two springs, $e^5$, one directly above each of the pickers $e'$. At their inner ends these springs rest upon the pins $e^8$, which pass loosely through apertures in the underlying plate $e^{10}$ and bear upon the adjacent pickers $e'$. Longitudinal adjustment of the pickers $e'$ is effected by means of a horizontal adjusting-screw, $e^7$, which is threaded through a suitable lug in the outer end of the shuttle, and is engaged with the ends of both front pickers by means of an annular flange on the inner end of said screw, which works in corresponding grooves in the adjacent faces of the pickers, and thereby enables said screw to either draw said pickers outward or force them inward, as occasion may require. This feature of construction is indicated more clearly in Fig. 5 of the drawings.

The shuttle I is actuated by a lever, K, fulcrumed on the frame at K', Figs. 3 and 4, and provided at its upper end with the slot $k'$, which engages with the pin and block $k$, located in a mortise or recess in the shuttle, as will be understood by reference to Figs. 2, 3, 4, and 5. The lower end of the lever K terminates in a laterally-projecting lug, $k^2$, which has the inclined form and direction shown in Fig. 4, and the end of which stands in proximity with the inner face of the sprocket-wheel H. For the actuation of said lever K, the sprocket-wheel is provided with a series of pins, $l$, arranged at uniform distances apart, and in such position that in the rotation of the wheel they will strike on the upper inclined surface of the projection $k^2$ of the lever K, and thereby force the lower end of the lever inward toward the axis of the wheel, and of course throw the upper end of the lever and the shuttle therewith connected outward. The opposite or return motion of the shuttle is accomplished by means of a spring, $k^4$, acting through the medium of a rod, $k^3$, flexibly connected with the lower end of the lever K, and movably supported by a bracket, $k^5$, between which and the nut on the end of the rod said spring is expansibly confined. The shuttle is thus thrown outwardly by positive means, but is thrown inwardly by means adapted to permit the arrest of the shuttle without injury to the machine in case the front pickers do not properly separate the barbs.

A suitable stop is provided on the bed-plate B, at the inner end of the shuttle, to arrest the inward throw of the latter; but none is necessary for the limitation of the outward throw, inasmuch as the spring immediately returns the shuttle the moment the pins $l$ escape the lug $k^2$ on the actuating-lever K.

Below the shuttle I, in the course of the descending barbs, is located a rock-stop, $g$, Figs. 1, 4, 6, and 7. Said rock-stop consists of a bent steel plate in the form of a clock-escapement, which is riveted to a casting pivoted at $g^3$ to a flange of the casting L. The bent ends $g'$ of the rock-stop $g$ are notched, so that in the rocking movement of said stop the notched ends embrace or pass on both sides of the wire F, one above the other, so as to be in position to successively intercept a falling barb. The stop is actuated to throw its upper end inwardly astride the wire F by means of a bracket, $g^5$, secured to the under side of the shuttle in position to strike the upper end of said stop. The opposite movement of the stop is produced by a contractile spring, $g^2$, secured at its upper end to a short arm, $g^4$, affixed to the stop, and at its lower end to a stationary arm secured to the casting L. The tension of this spring serves to keep the upper end of the stop constantly in contact with the bracket $g^5$. The oscillating movement of the stop or escapement $g$ is therefore induced and controlled by the movements of the shuttle, and is such that the barb detached by the pickers is first arrested by the upper end of the rock-stop, and after being released therefrom is next caught by the lower end of said stop.

A vibrating lever, $i$, is provided, to next arrest the barb in its fall along the wire F, a short distance below the rock-stop just described. This lever is more clearly shown in Fig. 4, wherein it will be seen to be pivoted at its upper end within the hollow box-shaped casting L, and to have its lower end, $i'$, bent outwardly in a horizontal direction and notched to straddle the said wire, in the same manner as described of the stops $g'$. The lever $i$ is actuated by a lever, $h$, centrally pivoted at $h'$ on a pin at the lower end of the box-shaped casting L. The upper end, $h^2$, of the lever $h$ is fitted into a recess in the lever $i$ below the pivotal point of the latter, as plainly indicated in Fig. 4, and an expanding-spring, $h^4$, is placed between the upper arm of the lever $h$ and the side of the box-shaped casting L, in position to force said upper end of the lever $h$ toward the lever $i$, and to thereby carry the lower forked end, $i'$, of the latter outward into position to catch the barb. The lower end of the lever $h$ is arranged in position to be struck by the pins $l$ on the sprocket-wheel H at the proper moment to retract the end $i'$ and release the barb arrested thereby.

At a suitable distance below the stop $i'$, and above the level of the axis of the sprocket-wheel H, is located an additional stop composed of two fingers, $m$, which are arranged to project, one on each side of the fence-wire, in position to arrest the barb by encountering its ends. Said fingers are directed toward the sprocket-wheel, and are vibrated so as to release the barb at the proper moment with reference to the position of a downwardly-approaching recess in said sprocket-wheel, into which the barb is delivered from these fingers. Said fingers $m$ consist of two plates, one of which is shown detached in Fig. 9, the other being similar to that shown in said figure, except that it is destitute of the projection at the top and that at the right-hand side, as shown in said figure. These plates or fingers $m$ are mounted on opposite sides of the plate M, Figs. 8 and 10, at its upper inner corner, and are rigidly connected to an axial pin which works freely in said plate M. The irregularly-shaped finger-plate shown in Fig. 9 is located on the rear or inner side of the plate M, and is provided with a laterally-projecting pin, $n^2$, near its upper margin. Engaging with this pin is a bent lever, $n$, pivoted at $n'$ to the plate M, and having its upper end forked to admit the pin $n^2$, as indicated in dotted lines of Figs. 8 and 10. The lower end of the lever n is arranged to engage with the pins l upon the inner face of the continuously-rotating sprocket-wheel, so as to be vibrated thereby and to effect the desired oscillating movement in the finger-plates by which said fingers m are retreated from beneath the barb at the proper moment to allow the latter to enter the adjacent and approaching recess of said sprocket-wheel. The fingers m are brought into position to catch a barb by means of the spring m², connected to a rear arm of the inner finger-plate, as indicated in Figs. 8 and 10.

The various moving parts or stops last above described, are so actuated as to successively cross the path of the falling barb and to arrest the same in its descent along the vertical portion of the fence-wire F. The several distances between the points at which the barbs are successively brought to rest by the several stops are desirably somewhat less than the distance between adjacent recesses in the sprocket-wheel for the reception of the barbs; and, in particular, the distance between the stop i' and the fingers m is preferably materially less than such intervals on the sprocket-wheel. The object of this arrangement of the said distances is to insure under all circumstances the presence of a barb on the fingers m in time to deliver the same into the proper recess of the sprocket-wheel. Inasmuch as there is a degree of friction of the fence-wire in the apertures of the barbs, it is possible to obtain a somewhat greater degree of velocity in the operation of the machine or in the feed of the fence-wire than would be given to the barbs if allowed to fall by gravity alone; but, for the purpose of insuring reliable action at all times, it is generally desirable that the machine be run at such speed for the fence-wire as does not exceed the velocity of the barbs, if allowed to fall by gravity alone through the short distances indicated.

The stationary plate M is preferably constructed, as shown, to project at a point a little below the finger m into the groove of the sprocket-wheel H, in order to properly guide the wire into said groove in case said wire is bent, (as often occurs,) and the adjacent vertical edge of said plate also operates to hold the barb from turning on the wire in the same manner as the same effect is produced by the plate d', &c., above described.

To more perfectly insure the pressure of the fence-wire F into the bottom of the peripheral groove of the sprocket-wheel, a yielding presser, O, Figs. 1 and 8, is provided, being arranged in a horizontal groove in the plate M, immediately below the point of said plate, which enters the groove of the sprocket-wheel, said presser being retained in place by an outer plate, M', as better shown in Figs. 8 and 10, so applied as to allow the presser to slide longitudinally with freedom. The inner end of said slide or presser O is inclined or rounded, as indicated in Fig. 8, and bears directly upon the wire, the intention being that when a barb strikes said presser the latter shall be retreated sufficiently to allow the barb to pass, after which the presser is again brought into position to bear upon the wire itself. For this purpose a suitable spring, o², Fig. 2, is provided, being arranged to throw said presser inward toward the sprocket-wheel. At its outer end said presser is provided with an adjusting-screw, O', arranged to bear against the end of the outer plate, M, and operating to limit the extent of inward throw on the part of said presser. The presser O is arranged in position to bear against the wire F at a point on the periphery of the sprocket-wheel slightly above the level of the axis of said wheel, whereby it serves to hold the wire in a direct line from the deflecting-wheel to the sprocket and prevents the deflection thereof that would naturally be produced by the bend of the wire toward the twister. This effect is important, for in the gravity-feed described it is obviously desirable that the wire shall pass in proper relation to the guide-plates and stops in order that the barbs may not be retarded by undue frictional bearing upon the former, or fail to be properly engaged and released by the latter.

The sprocket-wheel H is provided with a deep circumferential groove, preferably a little more than three-eighths of an inch in width, and of the sectional conformation shown in Fig. 3, being of less width than the length of the barbs. Said wheel is also provided with marginal transverse notches j' to receive the barbs from the fingers m. At or opposite each of these notches the bottom of the circumferential groove is deepened to form a recess about three-fourths of an inch long in the direction of the groove and about one-fourth of an inch deep, or rather more than one-half the depth or width of the barb at its middle point. Said notches j' are of course at equal distances apart, and preferably their rear walls (having reference to the direction of motion of the wheels) are extended beyond the general periphery of the wheel-flanges, as shown in Fig. 1; and said rear walls are retreated or curved backward, as also indicated in said figure. The object of this last-mentioned feature of construction is to bring the projecting points of the sprocket-wheel over the barb immediately after the latter has struck the fingers m, so that in case the barb shall rebound it will encounter the projections on the wheel and be forced downward thereby, and its entrance into the notch will be thus insured. The object of the recesses in the bottom of the groove, coincident with the transverse notches j', is to enable a kink or bend to be formed in the barbed wire at both sides of the barb, in order that the latter may be more certainly held in position longitudinally on the fence-wire after the second wire has been twisted therewith. For the purpose of producing this bend in the fence-wire, the wheel $p$, over which the second wire, $p'$, is guided, is fitted and arranged to enter the circumferential groove of the sprocket-wheel, and is adjustably held in bearing against the fence-wire within said groove. To this end the wheel $p$ is mounted on a lever, $p^2$, pivoted at $p^3$ to a stationary part of the machine, and connected by a rod, $p^4$, with a spring, $p^5$, the latter being arranged to throw the wheel $p$ into the groove of the sprocket-wheel, and adjusted to operate with sufficient force to press the barbs into the recesses and bend the wire F.

For the purpose of retaining the wire $p'$ upon the wheel $p$, the latter is preferably slightly grooved on its periphery, and is arranged with its upper margin between the plates M and M', as indicated in Fig. 1, the arrangement of said plates M and M' being better illustrated in Fig. 10. The grooved guide-roller $q$ receives the wire $p'$ from a reel conveniently placed to deliver the same, and directs it properly to the wheel $p$. As will be observed from Fig. 1 of the drawings, and as has been set forth, the fence-wire F is delivered vertically to the sprocket wheel, and, together with the auxiliary wire $p'$, is taken off said sprocket-wheel in a horizontal direction. The wheel $p$ is arranged to deliver the wire $p'$ to the sprocket-wheel and alongside the wire F, between the points at which the latter strikes and leaves the said sprocket-wheel. By reason of the bend produced in the wire F, as described, the wire $p'$ is enabled to twist with the wire F more closely to the barb, so as to hold the latter more certainly in place, and both wires are about equally bent, so as to be under substantially equal tension when the finished cable is put to use. In consequence of the bend thus produced in the wire F, and also for the purpose of insuring a proper uniformity in the spaces between barbs, it is desirable that the wire be made to advance with the same speed as the surface of the sprocket-wheel H, on which it bears. This is done by a proper regulation of the tension upon the spooler, which draws the wire firmly against the surface of said sprocket-wheel, acting in conjunction with the tension-giving presser O and wheel $p$, which have a constant and considerable pressure upon said wire in the sprocket-groove, as described. By reason of the pressure of said wheel $p$ against the wire, said wire is held from slipping upon the sprocket-wheel, and the latter is practically made to act as a positive feeding device for carrying the fence-wires forward. In consequence of such community of speeds between the sprocket-wheel and the wire F, the barbs, as soon as they engage said sprocket, are thereby temporarily held practically stationary on said wire until permanently fastened, which last effect, as contemplated in the machine shown, is accomplished by the application of the plain to the barbed wire to form a cable, as set forth. Except for the bends made in the wire F by forcing the barbs into the depressions in the groove of the sprocket, as specified, it would not be absolutely essential (though desirable) that the wire and sprocket surface advance thus uniformly; but to secure a uniform distance between the barbs it would be necessary that any difference of speed should be constant, and such constant relative movement of the wire and wheel (or barbs) would be equivalent to the constant stationary relation herein contemplated and produced.

The tension mechanism of the spooler may be of the ordinary adjustable construction now in use, or of any approved character. The manner in which the flier of the spooler and twister is herein geared in the machine, however, contributes to a better control of the speed of the fence-wire, as will be apparent from the following description.

N represents the flier-frame of the twisting and spooling mechanism. Said twisting mechanism is in this machine positively geared with the remaining moving parts of the machine, so that a uniform amount of twist between adjacent barbs is invariably produced in the cable. Thus, by reference to Figs. 1 and 2, B' is the driving-pulley, which receives the belt from any suitable source or medium of power, and on the shaft of said pulley is a pinion, C'. Upon the hub of the flier-shaft is also located a pinion, E', in the same plane with the pinion C'. An intermediate spur, D', communicates power from the driving-shaft to the flier. Upon the shaft $D^6$ of the wheel D' is located a miter-gear wheel, $D^2$, which meshes with the corresponding gear-wheel, $D^3$, on the transverse shaft $D^5$. Motion is communicated from the shaft $D^5$ to the shaft H' of the sprocket-wheel H by means of the pinion $D^4$ and spur $H^2$, as indicated in Fig. 2.

In view of the direct and positive connection of the flier with the other rotating parts of the machine, as described, it is necessary, in arresting the machine, (for the purpose of repairing a broken wire, supplying a missing barb, or for other reasons,) that the momentum of the flier shall be quickly overcome. To this end the brake-pulley F' is provided, being mounted on an extension of the flier-shaft adjacent to the sprocket-wheel, as shown in Fig. 1. The pulley is encircled by a brake-strap, $f'$, Figs. 1 and 2, one end of which is secured at $f^3$ to a suitable arm attached to the adjacent upright T' of the flier-frame, and the opposite end of which is attached to the foot-lever $f^2$. The brake-strap is thus, as indicated, arranged to nearly encircle the brake-pulley, and by applying power to the foot-lever the flier and entire machine will be simultaneously and speedily brought to rest. The location of the brake near the barbing parts of the machine, which are under constant observation of the operator, also enables the latter to stop the machine at once when necessity arises.

It is not necessary that the wire F shall be guided in an accurately vertical direction to obtain the effect of gravity in distributing or spacing the barbs; but obviously the more nearly vertical the course of said wire the more freely will the barbs fall thereon.

It will of course be understood that suitable tension devices of the ordinary or any approved construction will, if desired, be applied to the supply-spools from which the several wires are delivered to the machine.

I claim as my invention—

1. In a mechanism for spacing barbs strung upon a wire preparatory to securing them thereon, the combination of means for giving the wire a vertical direction, whereby the barbs may advance by gravity, means for feeding the wire forward, and means for temporarily holding the barbs at proper points on the wire, substantially as described.

2. In a mechanism for spacing barbs strung upon a wire preparatory to securing them, the combination, with feeding devices for the wire, of means for guiding said wire in a vertical direction for a portion of its length, means for separating the lowermost barbs one by one, at stated intervals, from a column on said vertical wire, means for temporarily holding the barbs at proper points on the wire, and means for delivering the barbs at proper intervals to said holding devices, substantially as described.

3. In a machine for spacing barbs strung upon a wire preparatory to securing them, the combination, with the rotating sprocket-wheel and means for directing the barb-carrying wire vertically thereto, of means for separating the barbs one by one, at stated intervals, from the bottom of a column of barbs on said vertical wire, means for catching the detached barb and delivering it into a recess of the sprocket, and one or more stops arranged between the said detaching and delivering devices, for intermediately arresting and releasing the barb, substantially as described.

4. In combination with the sprocket-wheel having peripheral notches at equal intervals thereon, and means for directing the barb-carrying wire vertically thereto, barb-separating devices arranged in the vertical course of the wire, and a series of stops between the latter and the sprocket, constructed to successively catch and release the detached barbs, and arranged at intervals less than those between the notches of the sprocket, substantially as described.

5. The combination, with a rotating wheel, H, having notches $j'$ at equal intervals thereon, and with means for directing the barb-carrying wire vertically thereto, of movable supports $e^2$ for the barbs $a$, movable pickers $e'$ for separating the barbs, and suitable means for actuating the supports and pickers simultaneously, substantially as described.

6. In combination with the rotating wheel H and means for directing the barb-carrying wire vertically thereto, a horizontally-reciprocating shuttle, I, barb-supports $e^2$ thereon, and separating-pickers $e'$, mounted on said shuttle in opposite relation thereto and higher than the supports, substantially as described.

7. In combination with the shuttle I, the stationary supports $e^2$, the vertically-movable pickers $e'$, and means for vertically adjusting said pickers, substantially as described.

8. In combination with the shuttle I and stationary supports $e^2$ thereon, the vertically-movable pickers $e'$ and springs applied to hold said pickers in place, whereby the latter may automatically adjust themselves to barbs of unequal thicknesses, substantially as described.

9. In combination with the shuttle I, carrying barb-supports $e^2$, and separating-pickers $e'$, a positive means for throwing the shuttle outward to deliver the barbs from the pickers $e'$ to the supports $e^2$, and a spring for giving the opposite movement to the shuttle, substantially as described, and for the purpose set forth.

10. In a mechanism for spacing barbs strung on wire preparatory to securing them, the combination, with a rotating wheel, H, and means for directing the barb-carrying wire vertically thereto, of means for delivering the barbs, one by one, to said wheel, and means for insuring practically equal speed of the wire and wheel-surface, substantially as described, and for the purpose set forth.

11. In combination with the shuttle-carrying devices for separating the barbs one by one, lateral supports for the wire adjacent to the shuttle, substantially as described.

12. In combination with a reciprocating shuttle for separating the barbs, a guide-plate, $d^3$, and an opposite movable guide-plate, $d^2$, arranged adjacent to the shuttle, substantially as described, and for the purposes set forth.

13. In combination with a wheel, H, and a wheel, E, for guiding the wire F in a vertical direction, and means for separating the barbs strung on the vertical part of the wire, a horizontal support adjacent to the wheel E, for the mass of strung barbs, and a movable stop or stops for retaining the barbs on said support, substantially as described.

14. In the horizontal support for the wire and barbs strung thereon, a table, $h$, having its end toward the delivery-spool laterally inclined, and a removable slotted gate constructed to stop the barbs while allowing the wire to pass, and operating to laterally retain the wire and barbs upon the table, substantially as described.

15. In the horizontal support for the wire and barbs strung thereon, a series of tables, $b$, having their ends toward the delivery-spool laterally inclined and their opposite ends depressed, a series of removable upwardly-slotted gates located at the depressed ends of said tables, and constructed to stop the barbs while permitting the wire to pass, and means for locking and releasing said gates, substantially as described.

16. In combination with the stationary wheel E for deflecting the course of the wire, a horizontal removable support for the wire and barbs, duplicate wire-guiding and barb-restraining mechanism, arranged side by side thereon, and means whereby the support may be shifted to bring either wire in line with the deflecting-wheel, substantially as described.

17. In combination with the stationary wheel E and upright D, the wire-support G, pivoted at its outer end, and provided with duplex guides for the wire, a shifting-lever, $r$, for throwing the free end of the support, and means for locking the support in its several positions, substantially as described.

18. In combination with the frame upright D, wheel E, and support G, pivoted at its outer end, the segmental arm $C^3$, provided with notches $r^4$, the lever $r$, pivoted to said arm and to the free end of the support G, and a latch, $r^3$, substantially as described.

19. In combination with the elevated support G, the plates or tables $b$, uprights $c$, constructed to give passage to the barbs, pivoted gates $c'$, provided with notches $c^4$, and buttons $c^2$, substantially as described, and for the purposes set forth.

20. In combination with the support G and table $b$ thereon, the trough $G'$, substantially as described.

21. In combination with the support G and table $b$, the trough $G'$ and wire-clamp $c^3$, substantially as described.

22. In combination with the support or carrier-frame G and central double table, $b$, thereon, a trough, $G'$, on each side of the central table, a wire-clamp, $c^3$, at the inner end of each trough, and a roller, $b'$, at the outer end of each trough, substantially as described.

23. In combination with the reciprocating shuttle carrying devices for separating the barbs, and with the rotating wheel H, provided with pins $l$, the pivoted lever K, engaged with the shuttle, and provided with the lug $k^2$ for engagement with the pins $l$, and a spring, $k^2$, substantially as described.

24. The combination, with the reciprocating shuttle carrying devices for separating the barbs on the vertical wire, and with the rock-stop $g$ beneath the shuttle, of a bracket, $g^5$, affixed to the shuttle, and a spring, $g^2$, substantially as described.

25. In combination with the more elevated barb-separating devices and with the lower sprocket-wheel, the vibrating stop $i'$, and means actuated by the said wheel for vibrating the said stop at regular intervals, substantially as described.

26. The combination, with the sprocket-wheel provided with the pins $l$ at equal intervals thereon, and with the vibrating stop-lever $i$, of the pivoted lever $h$, engaged with the lever $i$ below its center of motion, and the spring $h^4$, substantially as described.

27. In a machine for spacing barbs strung on wire, the combination of a notched wheel, H, means for guiding the barbed wire vertically thereto, a barb-separating shuttle, I, stops $g$ $i$ $m$, and devices, substantially as described, for operating said shuttle and stops in harmony with the movement of the wheel H, as set forth.

28. In combination with the grooved sprocket H and means for directing the wire vertically thereto, of the plate M, having its vertical edge in proximity to the sprocket, and the connected oscillating fingers $m$, arranged on opposite sides of said plate, substantially as described.

29. In combination with the grooved wheel H, constructed to receive the barbs, with means for directing the wire vertically thereto, and with means for deflecting the wire about said wheel, an adjustable guide, O, arranged opposite or above the axis of the wheel, substantially as and for the purpose set forth.

30. In combination with the grooved wheel H, provided with recesses deeper than the groove, an automatically-adjustable presser, whereby the barbs are forced into said recesses and the wire is bent, substantially as described.

31. In a machine for the purpose stated, the combination, with the sprocket spacing-wheel for the barbed wire, of means, substantially as specified, for delivering a supplemental wire to said sprocket-wheel, substantially as and for the purposes set forth.

32. In combination with the rotating grooved sprocket, with means for guiding the wire vertically thereto, and with a twister for taking the wire therefrom, a wheel, $p$, constructed to enter the groove for directing a second wire into the latter, and yielding-pressure devices for forcing the wheel $p$ into the groove of the sprocket, substantially as described.

33. In combination with the sprocket H and presser-wheel $p$, the grooved guide-roller $q$, for directing the plain wire, substantially as described.

34. The combination, with the sprocket-wheel H and wire-guiding presser-wheel $p$, of the plate M', substantially as shown, and for the purposes set forth.

35. In a machine for spacing barbs upon a wire and for securing them by a supplemental wire, the combination of a sprocket-wheel, means for delivering the barbed and supplemental wires thereto, and a twister arranged to receive the wires, substantially as described.

36. In a machine for spacing barbs on a wire and for securing them by a supplemental wire, the combination of a wheel, as H, means for delivering the barbed wire thereon at one point, means for delivering the supplemental wire thereon at a second point, and a twister arranged to take off both wires at a third point, substantially as described.

37. In a machine for spacing barbs on a wire and for securing them in place by a supplemental wire, the combination, with a wheel, as H, of means for delivering the barbed wire thereto at stated intervals, means for delivering the supplemental wire to said wheel, and a twister arranged to deflect said wires about the wheel and operating to twist said wires to the point where the wires leave the wheel, substantially as described.

38. In a machine for spacing barbs strung upon a wire and for securing them in place by a supplemental wire, the combination of an elevated support for the wire carrying the barbs and for the barbs massed thereon, a deflecting-wheel for said wire, a sprocket-wheel beneath the deflecting-wheel, devices for separating the barbs on the wire in its passage to the sprocket, means for conducting the supplemental wire into proximity with the barbed wire, and a twister, substantially as described.

39. In a machine for spacing barbs strung on a wire and for supplying a wire supplemental to that which carries the barbs, to form a cable, the combination of a twister, barb-spacing mechanism, mechanism for directing the supplemental wire, and gearing which positively connects the spacing mechanism with the twister, substantially as described.

40. The combination, with the elevated support G, the mechanism for directing the wire F vertically, and barb-spacing mechanism, of a twister and spooler located beneath the support, substantially as described.

41. In a wire barbing and twisting machine, the combination, with the barb-applying mechanism and with a flier geared therewith, of a brake-pulley, F, on the flier-shaft, a brake-strap, $f'$, and a lever, $f^2$, adjacent to the barbing mechanism, substantially as described.

42. In the manufacture of barbed wire, the method of spacing barbs strung on a wire, which consists in feeding the wire downward in a practically-vertical direction, advancing the barbs along the descending wire by gravity, and arresting them at proper intervals on the wire, substantially as described.

ORLANDO P. BRIGGS.

Witnesses:
H. S. SPRAGUE,
E. SCULLY.